(12) United States Patent
Rohde et al.

(10) Patent No.: US 7,803,736 B2
(45) Date of Patent: Sep. 28, 2010

(54) SUPPORTED CHROMIUM CATALYST AND ITS USE FOR PREPARING HOMOPOLYMERS AND COPOLYMERS OF ETHYLENE

(75) Inventors: Wolfgang Rohde, Speyer (DE); Guido Funk, Worms (DE); Andreas Haufe, Ludwigshafen (DE); Anke Bold, Dirmstein (DE); Neil Nadalin, Kelkheim-Ruppertshain (DE)

(73) Assignee: Basell Polyolefine GmbH, Wesseling (DE)

(*) Notice: Subject to any disclaimer, the term of this patent is extended or adjusted under 35 U.S.C. 154(b) by 0 days.

(21) Appl. No.: 10/538,536

(22) PCT Filed: Dec. 9, 2003

(86) PCT No.: PCT/EP03/13914

§ 371 (c)(1),
(2), (4) Date: Jun. 10, 2005

(87) PCT Pub. No.: WO2004/052948

PCT Pub. Date: Jun. 24, 2004

(65) Prior Publication Data

US 2006/0063666 A1 Mar. 23, 2006

Related U.S. Application Data

(60) Provisional application No. 60/446,936, filed on Feb. 12, 2003, provisional application No. 60/467,633, filed on May 2, 2003.

(30) Foreign Application Priority Data

Dec. 10, 2002 (DE) ................ 102 57 740

(51) Int. Cl.
*B01J 23/00* (2006.01)
*B01J 21/00* (2006.01)
*B01J 20/00* (2006.01)

(52) U.S. Cl. ............... 502/309; 502/242; 502/256; 502/257; 502/319; 502/320; 502/350; 502/351; 502/355; 502/407; 502/415; 502/439

(58) Field of Classification Search .......... 502/242, 502/256–257, 309, 319–320, 350, 351, 355, 502/407, 415, 439
See application file for complete search history.

(56) References Cited

U.S. PATENT DOCUMENTS

| | | | | |
|---|---|---|---|---|
| 3,242,150 A | 3/1966 | Scoggin | ............... | 260/88.2 |
| 3,248,179 A | 4/1966 | Norwood | ............... | 23/285 |
| 3,565,919 A * | 2/1971 | Friedrichsen et al. | ......... | 549/249 |
| 3,798,202 A | 3/1974 | Nasser, Jr. | ............... | 260/88.2 |
| 3,872,217 A | 3/1975 | Merz et al. | ............... | 423/338 |
| 3,892,897 A * | 7/1975 | Rittler | ............... | 502/309 |
| 4,037,042 A | 7/1977 | Mueller-Tamm et al. | ...... | 526/106 |
| 4,173,548 A | 11/1979 | Pullukat et al. | ............... | 252/430 |
| 4,194,074 A | 3/1980 | Pullukat et al. | ............... | 526/100 |
| 4,284,527 A | 8/1981 | Pullukat et al. | ............... | 252/430 |
| 4,295,999 A * | 10/1981 | Slaugh | ............... | 502/242 |
| 4,301,034 A * | 11/1981 | McDaniel | ............... | 502/236 |
| 4,339,559 A * | 7/1982 | McDaniel | ............... | 526/106 |
| 4,435,314 A | 3/1984 | van de Leemput et al. | ... | 502/154 |
| 4,442,275 A | 4/1984 | Martin | ............... | 526/96 |
| 4,728,703 A * | 3/1988 | Konrad et al. | ............... | 526/105 |
| 5,284,811 A * | 2/1994 | Witt et al. | ............... | 502/210 |
| 6,162,759 A * | 12/2000 | Oki et al. | ............... | 502/350 |
| 6,649,709 B1 | 11/2003 | Bauer et al. | ............... | 526/88 |
| 6,743,467 B1 * | 6/2004 | Jones et al. | ............... | 427/180 |
| 6,849,699 B2 | 2/2005 | Bauer et al. | ............... | 526/88 |
| 7,019,089 B2 * | 3/2006 | Schneider et al. | ............... | 526/113 |
| 2002/0172697 A1 * | 11/2002 | Nakade et al. | ............... | 424/401 |
| 2004/0014914 A1 | 1/2004 | Schneider et al. | ............... | 526/129 |
| 2004/0209772 A1 * | 10/2004 | Fukunaga et al. | ............... | 502/332 |
| 2005/0031529 A1 * | 2/2005 | Hibi et al. | ............... | 423/502 |
| 2006/0058180 A1 | 3/2006 | Gregorius et al. | | |

FOREIGN PATENT DOCUMENTS

| | | |
|---|---|---|
| BE | 861275 | 3/1978 |
| DE | 2103243 | 8/1972 |
| DE | 2540279 | 3/1977 |
| DE | 3635715 | 5/1988 |
| EP | 0166157 | 1/1986 |
| EP | 0882740 | 12/1998 |
| EP | 0882741 | 12/1998 |
| JP | 54141893 | 11/1979 |
| JP | 57049605 | 3/1982 |
| WO | 9217511 | 10/1992 |
| WO | 9929736 | 6/1999 |
| WO | 0202652 | 1/2002 |
| WO | WO2004/055070 | 7/2004 |

OTHER PUBLICATIONS

S. Brunauer et al., "Adsorption of Gases in Multimolecular Layers," *The Journal of the American Chemical Society*, vol. 60, p. 309-319 (1939).

* cited by examiner

*Primary Examiner*—Cam N Nguyen
(74) *Attorney, Agent, or Firm*—Jarrod N. Raphael; Jonathan L. Schuchardt

(57) ABSTRACT

A process for preparing supported, titanized chromium catalysts is disclosed. The process comprises A) bringing a support material into contact with a protic medium comprising a titanium compound and a chromium compound; B) optionally removing the solvent; C) optionally calcining the precatalyst obtained after step B); and D) optionally activating the precatalyst obtained after step B) or C) in an oxygen-containing atmosphere at from 400° C. to 1100° C.

7 Claims, No Drawings

SUPPORTED CHROMIUM CATALYST AND ITS USE FOR PREPARING HOMOPOLYMERS AND COPOLYMERS OF ETHYLENE

This application is the U.S. national phase of International Application PCT/EP2003/013914, filed Dec. 9, 2003, claiming priority to German Patent Application 10257740.4 filed Dec. 10, 2002, and the benefit under 35 U.S.C. 119(e) of U.S. Provisional Application Nos. 60/446,936, filed Feb. 12, 2003 and 60/437,633 filed May 2, 2003; the disclosures of International Application PCT/EP2003/013914, German Patent Application 10257740.4 and U.S. Provisional Application Nos. 60/446,936 and 60/437,633, each as filed, are incorporated herein by reference.

FIELD OF THE INVENTION

The present invention relates to novel supported, titanized chromium catalysts for the homopolymerization of ethylene and the copolymerization of ethylene with α-olefins, a process for preparing them and their use for the polymerization of olefins.

The present invention relates to novel supported, titanized chromium catalysts for the homopolymerization of ethylene and the copolymerizaton of ethylene with α-olefins, a process for preparing them and their use for the polymerization of olefins.

BACKGROUND OF THE INVENTION

Ethylene homopolymers and copolymers of ethylene with higher α-olefins such as 1-butene, 1-pentene, 1-hexene or 1-octene can be prepared, for example, by polymerization using supported titanium compounds, known as Ziegler-Natta catalysts, or else using supported chromium compounds, known as Phillips catalysts. When the homopolymers and copolymers of ethylene are used, for example, for blown film extrusion, it is important that the polymers have a good balance between mechanical properties and processability.

Ethylene homopolymers and copolymers of ethylene with higher α-olefins such as 1-butene, 1-pentene, 1-hexene or 1-octene can be prepared, for example, by polymerization using supported titanium compounds, known as Ziegler-Natta catalysts, or else using supported chromium compounds, known as Phillips catalysts. When the homopolymers and copolymers of ethylene are used, for example, for blown film extrusion, it is important that the polymers have a good balance between mechanical properties and processability.

It is known that supported chromium catalysts are very suitable for producing ethylene copolymers having good mechanical properties. The properties of the polymers obtained in the polymerization are dependent on the way in which the chromium catalyst used has been prepared, in particular on the type of support material, e.g. its chemical structure, composition, surface area or pore volume, the type of chromium compound used, the presence of further compounds, e.g. titanium compounds, aluminum alkyls or carbon monoxide, the order in which the various components are applied or the manner of calcination and activation. It is a combination of the starting materials used together with the procedure for application to a support which then gives the desired chromium catalyst for the preparation of polymers having the property profile required for the specific application.

The supported chromium catalysts are often titanized, i.e. they comprise not only the chromium compound but also variable proportions of a titanium compound by means of which the molar mass distribution and the HLMI (high load melt index), for example, can be influenced. The application of the titanium compound to the support is usually carried out during the preparation of the hydrogel, giving an $SiO_2$—$TiO_2$ cogel. In this, the titanium dioxide is uniformly distributed throughout the support material. A disadvantage is that only a fraction of the total titanium oxide is available for polymerization at the pore surface of the catalyst. For this reason, numerous embodiments of titanized chromium catalysts in which the titanium compound is applied in a targeted manner to the pore surface, usually in a step separate from the doping of the chromium compound, have been developed.

Thus, for example, EP-A-882740 describes a process for preparing a supported chromium catalyst, in which the support material has a specific surface area of from 450 to 600 $m^2/g$ and the chromium component is applied to the support first and the titanium compound is applied subsequently, with the titanization being carried out at temperatures of at least 300° C.

EP-A-882741 teaches that polyethylenes having favourable ultimate tensile strengths are obtained when using a supported chromium catalyst whose support material has a specific surface area of at least 400 $m^2/g$ and has been dehydrated before use and in the preparation of which the chromium component is applied to the support first and the titanium compound is applied subsequently.

The application of a mixture of a chromium compound and a titanium compound in an aprotic solvent to a support under aprotic conditions is described in JP 54141893 and JP 57049605.

However, the preparation and handling of organometallic compounds under aprotic conditions is complicated and costly, since the solvents have to be dried before use. In addition, only few chromium compounds are soluble in aprotic media. An increase in the solubility of chromium compounds in aprotic solvents can often only be achieved by means of a complicated synthesis.

SUMMARY OF THE INVENTION

It is an object of the present invention to provide a novel, less complicated process for preparing supported, titanized chromium catalysts.

It is an object of the present invention to provide a novel, less complicated process for preparing supported, titanized chromium catalysts.

We have found that this object is achieved by a process for preparing supported, titanized chromium catalysts, which comprises the following steps:
A) bringing a support material into contact with a protic medium comprising a titanium compound and a chromium compound,
B) optionally removing the solvent,
C) optionally calcining the precatalyst obtained after step B) and
D) optionally activating the precatalyst obtained after step B) or C) in an oxygen-containing atmosphere at from 400° C. to 1100° C.

The invention further provides novel supported, titanized chromium catalysts which are suitable for the polymerization of ethylene and, if desired, further comonomers and are obtainable by the process of the present invention. This novel supported, titanized chromium catalyst for the homopolymerization of ethylene and the copolymerization of ethylene with α-olefins will in the interests of brevity hereinafter be referred to as "chromium catalyst of the present invention".

The invention also provides a process for preparing homopolymers of ethylene and copolymers of ethylene with α-olefins by polymerization of ethylene or mixtures of ethylene and α-olefins using at least one chromium catalyst according to the present invention, the homopolymers and copolymers of ethylene obtainable therefrom and their use for producing films.

DETAILED DESCRIPTION OF THE INVENTION

Accordingly, it has now been found that homopolymers and especially copolymers of ethylene are obtained in particularly good yields when using the chromium catalysts of the present invention. The film products obtained therefrom also have a very high puncture resistance.

Accordingly, it has now been found that homopolymers and especially copolymers of ethylene are obtained in particularly good yields when using the chromium catalysts of the present invention. The film products obtained therefrom also have a very high puncture resistance.

In view of the prior art, it was not to be expected that this novel process would make it possible to obtain a very active catalyst which leads to ethylene polymers which, when blown to produce films, display particularly good mechanical properties.

One constituent of the chromium catalyst of the present invention is the support material, in particular an inorganic solid, which is usually porous. Preference is given to oxidic support materials which may still contain hydroxy groups. The inorganic metal oxide can be spherical or granular. Examples of such solids, which are known to those skilled in the art, are aluminum oxide, silicon dioxide (silica gel), titanium dioxide and their mixed oxides or cogels, and aluminum phosphate. Further suitable support materials can be obtained by modification of the pore surface, e.g. by means of compounds of the elements boron (BE-A-61,275), aluminum (U.S. Pat. No. 4,284,527), silicon (EP-A-0 166 157) or phosphorus (DE-A 36 35 715). Preference is given to using a silica gel. Preference is given to spherical or granular silica gels, which in the case of the former may be spray dried.

Preferred support materials are finely divided silica xerogels which can be prepared, for example, as described in DE-A 25 40 279. The finely divided silica xerogels are preferably prepared by:

a) use of a particulate silica hydrogel which has a solids content of from 10 to 25% by weight (calculated as $SiO_2$) and is largely spherical, has a particle diameter of from 1 to 8 mm and is obtained by
  a1) introducing a sodium or potassium water glass solution into a swirling stream of an aqueous mineral acid, both longitudinally and tangentially to the main direction of flow,
  a2) spraying the resulting silica hydrosol into a gaseous medium so as to form droplets,
  a3) allowing the sprayed hydrosol to solidify in the gaseous medium,
  a4) freeing the resulting largely spherical particles of the hydrogel of salts without prior aging by washing,
b) extraction of at least 60% of the water present in the hydrogel by means of an organic liquid,
c) drying of the resulting gel at up to 180° C. and a reduced pressure of 13 mbar for 30 minutes until no further weight loss occurs (xerogel formation) and
d) adjustment of the particle diameter of the xerogel obtained to from 20 to 2000 μm.

In the first step a) of the preparation of the support material, it is important to use a silica hydrogel which has a relatively high solids content of from 10 to 25% by weight (calculated as $SiO_2$), preferably from 12 to 20% by weight, particularly preferably from 14 to 20% by weight, and is largely spherical. This silica hydrogel has been prepared in a specific manner as described in steps a1) to a4). The steps a1) to a3) are described in more detail in DE-A 21 03 243. Step a4), viz. washing of the hydrogel, can be carried out in any desired manner, for example by the countercurrent principle using water which contains a small amount of ammonia (pH up to about 10) and is at up to 80° C.

The extraction of the water from the hydrogel (step b)) is preferably carried out using an organic liquid, which is particularly preferably miscible with water, from the group consisting of $C_1$-$C_4$-alcohols and/or $C_3$-$C_5$-ketones. Particularly preferred alcohols are tert-butanol, i-propanol, ethanol and methanol. Among the ketones, preference is given to acetone. The organic liquid can also consist of mixtures of the above-mentioned organic liquids; in any case, the organic liquid contains less than 5% by weight, preferably less than 3% by weight, of water prior to the extraction. The extraction can be carried out in customary extraction apparatuses, e.g. column extractors.

Drying (step c)) is preferably carried out at from 30 to 140° C., particularly preferably from 80 to 110° C., and pressures of preferably from 1.3 mbar to atmospheric pressure. For reasons of the vapor pressure, a rise in temperature should be accompanied by a rise in pressure and vice versa.

The adjustment of the particle diameter of the resulting xerogel (step d)) can be carried out in any desired manner, e.g. by milling and sieving.

A further preferred support material is produced, for example, by spray drying milled, appropriately sieved hydrogels which are for this purpose mixed with water or an aliphatic alcohol. The primary particles are porous granular particles of the appropriately milled and sieved hydrogel which have a mean particle diameter of from 1 to 20 μm, preferably from 1 to 5 μm. Preference is given to using milled and sieved $SiO_2$ hydrogels.

In general, the mean particle diameter of the support particles is in the range from 1 to 1000 μm, preferably in the range from 10 to 500 μm and particularly preferably in the range from 30 to 150 μm.

The mean average pore volume of the support material used is in the range from 0.1 to 10 ml/g, in particular from 0.8 to 4.0 ml/g and particularly preferably from 1 to 25 ml/g.

In general, the support particles have a specific surface area of from 10 to 1000 $m^2$/g, in particular from 100 to 600 $m^2$/g, in particular from 200 to 550 $m^2$/g.

The specific surface area and the mean pore volume are determined by nitrogen adsorption in accordance with the BET method, as described, for example, by S. Brunauer, P. Emmett and E. Teller in Journal of the American Chemical Society, 60, (1939), pages 209-319.

In addition, the support particles used according to the present invention have a mean pore diameter of from 80 to 250 Å, preferably from 90 to 210 Å and particularly preferably from 95 to 200 Å. The mean pore diameter in Å is calculated by dividing the numerical value of the mean pore volume (in $cm^3$/g) by the numerical value of the specific surface area (in $m^2$/g) and multiplying the result by 40 000. Suitable support materials are also commercially available.

The support material can also have been partially or fully modified before use in the process of the present invention. The support material can, for example, be treated under oxidizing or non-oxidizing conditions at from 200 to 1000° C., in the presence or absence of fluorinating agents such as ammonium hexafluorosilicate. In this way, it is possible, for example, to vary the water and/or OH group content. The support material is preferably dried under reduced pressure at from 100 to 200° C. for from 1 to 10 hours before use in the process of the present invention.

In step A), the support-material is brought into contact with a protic medium comprising, preferably consisting of, a titanium compound and a chromium compound. The titanium compound and the chromium compound can be dissolved or suspended in the protic solvent and are preferably both dissolved. The titanium compound and the chromium compound can be brought into contact with the solvent in any order, simultaneously or as a premixed mixture. The titanium compound and the chromium compound are preferably mixed separately, in any order, with the solvent. The reaction time is usually in the range from 10 seconds to 24 hours, preferably from 1 minute to 10 hours and particularly preferably from 10 minutes to 5 hours, before the protic medium is brought into contact with the support material.

As titanium compound, preference is given to using a tetravalent compound of the formula $(RO)_nX_{4-n}Ti$, where the radicals R are identical or different and are each an organosilicon or carboorganic substituent having from 1 to 20 carbon atoms, e.g. a linear, branched or cyclic $C_1$-$C_{20}$-alkyl group such as methyl, ethyl, n-propyl, isopropyl, n-butyl, sec-butyl, isobutyl, tert-butyl, n-pentyl, sec-pentyl, isopentyl, n-hexyl, cyclohexyl, n-heptyl or n-octyl, a $C_6$-$C_{18}$-aryl group such as phenyl, 1-naphthyl, 2-naphthyl, 1-anthryl, 2-anthryl, 9-anthryl and 1-penanthryl or a trialkylsilyl group such as trimethylsilyl or triethylsilyl. R is preferably a linear or branched $C_1$-$C_6$-alkyl group such as methyl, ethyl, n-propyl, isopropyl, n-butyl, sec-butyl, isobutyl, tert-butyl, n-pentyl or n-hexyl. X can be a halogen such as fluorine, chlorine, bromine or iodine, preferably chlorine. n is from 0 to 4 and is preferably 4. Mixtures of various titanium compounds can also be used. The titanium compound is preferably soluble in the protic solvent and preference is therefore given to using titanium tetralkoxides because they have good solubilities in very many solvents. Apart from compounds of titanium with simple aliphatic alkoxides, it is also possible for bifunctional ligands such as bisalkoxides or ethoxyaminates to be present. Particularly useful compounds are bis(triethanolamine) bis (isopropyl)titanate or ammonium salts of lactic acid-titanium complexes which are soluble in water.

The chromium compounds can contain inorganic or organic groups. Preference is given to inorganic chromium compounds. Examples of chromium compounds include chromium trioxide and chromium hydroxide and also salts of trivalent chromium with organic and inorganic acids, e.g. chromium acetate, chromium oxalate, chromium sulfate and chromium nitrate, and chelates of trivalent chromium, e.g. chromium acetylacetonate. Among these, very particular preference is given to using chromium(III) nitrate 9-hydrate and chromium acetylacetonate. In preferred chromium compounds the oxidation state of the chromium is lower than 6 and preferentially chromium is in the oxidation state 2, 3 or 4.

The protic medium is a solvent or solvent mixture comprising from 1 to 100% by weight, preferably from 50 to 100% by weight and particularly preferably 100% by weight, of a protic solvent or a mixture of protic solvents and from 99 to 0% by weight, preferably from 50 to 0% by weight and particularly preferably 0% by weight, of an aprotic solvent or a mixture of aprotic solvents, in each case based on the protic medium.

Protic solvents are, for example, alcohols $R^1$—OH, amines $NR^1_{2-x}H_{x+1}$, $C_1$-$C_5$-carboxylic acids and inorganic aqueous acids such as dilute hydrochloric acid or sulfuric acid, water, aqueous ammonia or mixtures thereof, preferably alcohols $R^1$—OH, where $R^1$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part or $SiR^2_3$, where $R^2$ are each, independently of one another, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, and x is 1 or 2. Examples of possible radicals $R^1$ or $R^2$ are: $C_1$-$C_{20}$-alkyl which may be linear or branched, e.g. methyl, ethyl, n-propyl, iso-propyl, n-butyl, isobutyl, tert-butyl, n-pentyl, n-hexyl, n-heptyl, n-octyl, n-nonyl, n-decyl or n-dodecyl, 5- to 7-membered cyloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two $R^1$ or two $R^2$ may in each case also be joined to form a 5- or 6-membered ring and the organic radicals $R^1$ and $R^2$ may also be substituted by halogens such as fluorine, chlorine or bromine. Preferred carboxylic acids are $C_1$-$C_3$-carboxylic acids such as formic acid or acetic acid. Preferred alcohols $R^1$—OH are methanol, ethanol, 1-propanol, 2-propanol, 1-butanol, 2-butanol, 1-pentanol, 2-pentanol, 1-hexanol, 2-ethylhexanol, 2,2-dimethylethanol or 2,2-dimethylpropanol, in particular methanol, ethanol, 1-propanol, 1-butanol, 1-pentanol, 1-hexanol or 2-ethylhexanol. The water content of the protic medium is preferably less than 20% by weight.

Examples of aprotic solvents are aliphatic and aromatic hydrocarbons such as pentane, hexane, heptane, octane, isooctane, nonane, dodecane, cyclohexane, benzene and $C_7$-$C_{10}$-alkylbenzenes such as toluene, xylene or ethylbenzene.

The support material can be brought into contact with the protic medium comprising the titanium compound and the chromium compound in any desired way. Thus, the mixture of protic medium, titanium compound and chromium compound can be added to the support material or the support material can be introduced into the mixture. The support material can also be slurried in a suspension medium beforehand. The mixture of suspension medium used and protic medium comprises from 1 to 100% by weight, preferably from 50 to 100% by weight and particularly preferably 100% by weight, of a protic solvent or a mixture of protic solvents and from 99 to 0% by weight, preferably from 50 to 0% by weight and particularly preferably 0% by weight, of an aprotic solvent or a mixture of aprotic solvents, in each case based on the mixture of the suspension medium used and the protic medium. This suspension medium is preferably likewise the protic medium used according to the present invention.

The chromium compound is usually present in a concentration of from 0.05 to 20% by weight, preferably from 0.1 to 15% by weight and particularly preferably from 0.5 to 10% by weight, based on the protic medium. The titanium compound is usually present in a concentration of from 0.05 to 30% by weight, preferably from 0.1 to 20% by weight and particularly preferably from 0.5 to 15% by weight, based on the protic medium. The molar ratio of chromium compound to titanium compound is usually in the range from 10:1 to 1:10, preferably from 5:1 to 1:7 and particularly preferably from 4:1 to 1:5.

The support material is generally loaded in a weight ratio of supported gel particles:Ti in the titanium compound of from 100:0.1 to 100:12, in particular from 100:1 to 100:6, and a weight ratio of support gel particles:chromium in the chromium compound of from 100:0.1 to 100:10, in particular from 100:0.3 to 100:3.

Reaction step A) can be carried out at from 0 to 150° C. For cost reasons, preference is given to room temperature.

The solvent can optionally be removed in a subsequent step B), preferably at from 20 to 150° C. and pressures of from 10 mbar to 1 mbar. Preference is given to removing part or all of the solvent. The precatalyst obtained in this way can be completely dry or can contain some residual moisture. The volatile constituents still present are preferably present in an amount of not more than 20% by weight, in particular not more than 10% by weight, based on the not yet activated chromium-containing precatalyst.

The precatalyst obtained from reaction step B) can immediately be subjected to step D) or can be calcined beforehand at above 280° C. in a water-free inert gas atmosphere in step C). The calcination is preferably carried out at from 280 to 800° C. in a fluidized bed for from 10 to 1000 minutes.

The intermediate obtained in this way from step B) or C) is then activated in step D) under oxidizing conditions, for example in an oxygen-containing atmosphere at from 400 to 1000° C. The intermediate obtained in step B) or C) is preferably activated directly in the fluidized bed by replacing the inert gas by an oxygen-containing gas and increasing the temperature to the activation temperature. The intermediate is advantageously heated at from 400 to 1100° C., in particular from 500 to 800° C., in a water-free gas stream in which oxygen is present in a concentration of above 10% by volume for from 10 to 1000 minutes, in particular from 150 to 750 minutes, and then cooled to room temperature, resulting in the Phillips catalyst to be used according to the present invention. The maximum temperature of the activation is below, preferably at least 20-100° C. below, the sintering temperature of the intermediate from step B) or C). This oxidation can also be carried out in the presence of suitable fluorinating agents such as ammonium hexafluorosilicate.

A preferred process for preparing the supported, titanized chromium catalysts comprises the followings steps:
A) bringing a support material into contact with a protic medium comprising a titanium compound and a chromium compound,
B) removing the solvent,
C) calcining the precatalyst obtained after step B) and
D) activating the precatalyst obtained after step C) in an oxygen-containing atmosphere at from 400° C. to 1100° C.

Particular preference is given to a process consisting of the steps A) to D).

The chromium catalyst of the present invention advantageously has a chromium content of from 0.1 to 5% by weight, in particular from 0.3 to 2% by weight, and a titanium content of from 0.5 to 10% by weight, in particular from 1 to 5% by weight.

The catalyst systems of the present invention have a short induction period in the polymerization of 1-alkenes.

The resulting chromium catalyst to be used according to the present invention can also be reduced, for example by means of ethylene and/or α-olefins, carbon monoxide or triethylborane, in suspension or in the gas phase before use or it can be modified by silylation. The molar ratio of reducing agent to chromium (of the chromium catalyst according to the present invention to be reduced) is usually in the range from 0.05:1 to 500:1, preferably from 0.1:1 to 50:1, in particular from 0.5:1 to 5.0:1.

In suspension, the reduction temperature is generally in the range from 10 to 200° C., preferably in the range from 10 to 100° C., and the pressure is in the range from 0.1 to 500 bar, preferably the range from 1 to 200 bar.

The reduction temperature in fluidized-bed processes is usually in the range from 10 to 1000° C., preferably from 10 to 800° C., in particular from 10 to 600° C. In general, the gas-phase reduction is carried out in the pressure range from 0.1 to 500 bar, preferably in the range from 1 to 100 bar and in particular in the range from 5 to 20 bar.

In the gas-phase reduction, the chromium catalyst to be reduced is generally fluidized by means of an inert carrier gas stream, for example nitrogen or argon, in a fluidized-bed reactor. The carrier gas stream is usually laden with the reducing agent, with liquid reducing agents preferably having a vapor pressure of at least 1 mbar under normal conditions.

The chromium catalyst of the present invention is very useful for the preparation of homopolymers of ethylene and copolymers of ethylene with α-olefins in the customary processes known for the polymerization of olefins at temperatures in the range from 20 to 300° C. and pressures of from 5 to 400 bar, for example solution processes, suspension processes in stirring autoclaves or in a loop reactor, stirred gas phases or gas-phase fluidized-bed processes, which may be carried out continuously or batchwise. The advantageous pressure and temperature ranges for carrying out the process accordingly depend greatly on the polymerization method.

In particular, temperatures of from 50 to 150° C., preferably from 70 to 120° C., and pressures which are generally in the range from 1 to 400 bar are set in these polymerization processes. As solvent or suspension medium, it is possible to use inert hydrocarbons such as isobutane or else the monomers themselves, for example higher olefins such as propene, butene or hexene in a liquefied or liquid state. The solids content of the suspension is generally in the range from 10 to 80% by weight. The polymerization can be carried out either batchwise, e.g. in stirring autoclaves, or continuously, e.g. in tube reactors, preferably in loop reactors. In particular, it can be carried out sing the Phillips PF process as described in U.S. Pat. Nos. 3,242,150 and 3,248,179.

Among the polymerization processes mentioned, gas-phase polymerization, in particular in gas-phase fluidized-bed reactors, is preferred according to the present invention. It has been found that despite the variety of processing steps and the spray-dried support materials, no fine dust is formed during the gas-phase polymerization. In general, it is carried out at a temperature which is at least a few degrees under the softening temperature of the polymer. The gas-phase polymerization can also be carried out in the condensed, super-condensed or supercritical mode.

The different polymerization processes, or even the same polymerization process, can, if desired, be connected in series so as to form a polymerization cascade. However, the special catalyst composition makes it possible for the polymers according to the present invention to be readily obtained from a single reactor.

Examples of suitable α-olefins which can be copolymerized with ethylene are monoolefins and diolefins having from three to 15 carbon atoms in the molecule. Well-suited α-olefins of this type are propene, 1-butene, 1-pentene, 1-hexene, 1-octene, 1-decene, 1-dodecene and 1-pentadecene and also the conjugated and nonconjugated diolefins butadiene, penta-1,3-diene, 2,3-dimethylbutadiene, penta-1,4-diene, hexa-1,5- diene and vinylcyclohexene. Mixtures of these comonomers can also be used. Preference is given to using 1-butene, 1-hexene or 1-octene, in particular 1-hexene.

To control the molar mass, hydrogen can advantageously be used as regulator in the polymerization.

It has been found to be advantageous to carry out the polymerization of the 1-alkenes by means of the catalysts of the present invention in the presence of organometallic compounds of elements of the first, second, third or fourth main group or of the second transition group of the Periodic Table of the Elements. Well-suited compounds of this type are homoleptic $C_1$-$C_{10}$-alkyls of lithium, boron, aluminum or zinc, e.g. n-butyllithium, triethylboron, trimethylaluminum, triethylaluminum, triisobutylaluminum, tributylaluminum, trihexylaluminum, trioctylaluminum and diethylzinc. Furthermore, $C_1$-$C_{10}$-dialkylaluminum alkoxides such as diethylaluminum methoxide are also well suited. It is also possible to use dimethylaluminum chloride, methylaluminum dichloride, methylaluminum sesquichloride or diethylaluminum chloride. n-Butyllithium and trihexylaluminum are particularly preferred as organometallic compound. Mixtures of the above-described organometallic compounds are generally also well suited.

The molar ratio of organometallic compound:chromium is usually in the range from 0.1:1 to 50:1, preferably in the range from 1:1 to 50:1. However, since many of the activators, e.g. aluminum alkyls, can also be used at the same time for removing catalyst poisons (known as scavengers), the amount used is dependent on the impurities present in the other starting materials. However, a person skilled in the art can determine the optimum amount by means of simple tests.

The chromium catalysts of the present invention can also be used together with another catalyst suitable for the polymerization of α-olefins in the above polymerization processes. The chromium catalyst of the present invention is preferably used together with another supported chromium catalyst customary for the polymerization of α-olefins. The use of two different supported chromium catalysts is described, for example, in WO 92/17511. The polymerization can also be carried out using two or more of the chromium catalysts of the present invention simultaneously. The polymerization is particularly preferably carried out using a chromium catalyst according to the present invention together with a supported, nontitanized chromium catalyst. Mixtures of titanized and nontitanized supported chromium catalysts are described, for example, in U.S. Pat. No. 3,798,202, but in that case the titanization is carried out only after the chromium component has been applied to a support.

The two different Phillips catalysts can be mixed before they come into contact with the monomers and can then be introduced together into the reactor, or they can be introduced into the reactor separately from one another, for example at a plurality of points.

The homopolymers and copolymers of ethylene prepared according to the present invention usually have a density, measured in accordance with DIN 53479, in the range from 0.9 to 0.97 g/cm$^3$, preferably in the range from 0.92 to 0.96 g/cm$^3$ and particularly preferably in the range from 0.925 to 0.945 g/cm$^3$, and a melt flow index (MI (190° C./2.16 kg) or HLMI (190° C./21.6 kg)), measured in accordance with DIN 53735 under different loads (in brackets), in the range from 0 to 10 g/10 min, preferably in the range from 0.01 to 1 g/10 min and particularly preferably in the range from 0.05 to 0.6 g/10 min, in the case of MI and in the range from 1 to 50 g/10 min, preferably in the range from 3 to 30 g/10 min and particularly preferably in the range from 5 to 25 g/10 min, in the case of the HLMI.

The weight average molar mass $M_w$ is generally in the range from 10 000 to 7 000 000 g/mol, preferably in the range from 100 000 to 500 000 g/mol. The molar mass distribution $M_w/M_n$, measured by GPC (gel permeation chromatography) at 135° C. in 1,2,4-trichlorobenzene using polyethylene standards, is usually in the range from 3 to 50, preferably in the range from 8 to 30 and particularly preferably in the range from 15 to 30.

In general, the ethylene polymers produced in the reactor are melted and homogenized in an extruder. The melt flow index and the density of the extrudate can then differ from the corresponding parameters for the crude polymer, but are also in the range specified according to the present invention.

In the olefin polymerization in which the catalyst prepared according to the present invention is used, it is possible to prepare homopolymers of ethylene or copolymers of ethylene with a comonomer having from 3 to 12 carbon atoms in an amount of up to 10 mol % of comonomer in the copolymer. Preferred copolymers contain from 0.3 to 1.5 mol % of hexene, based on the polymer, particularly preferably from 0.5 to 1 mol % of hexene.

The ethylene copolymer prepared according to the present invention can also form mixtures with other olefin polymers, in particular homopolymers and copolymers of ethylene. These mixtures can, on the one hand, be prepared by the above-described simultaneous polymerization of a plurality of chromium catalysts. On the other hand, these mixtures can also be obtained simply by subsequent blending of the polymers prepared according to the present invention with other homopolymers or copolymers of ethylene. MFI, HLMI, density, comonomer content, $M_w$ and $M_w/M_n$ of these mixtures are preferably likewise in the same ranges as those for the polymers which have been prepared using only a titanium-containing chromium catalyst according to the present invention.

In addition, the ethylene copolymers, polymer mixtures and blends can further comprise auxiliaries and/or additives known per se, e.g. processing stabilizers, stabilizers against the action of light and heat, customary additives such as lubricants, antioxidants, antiblocking agents and antistatics, and also, if desired, colorants. The type and amounts of these additives are well known to those skilled in the art.

The polymers prepared according to the present invention can also be modified subsequently by grafting, crosslinking, hydrogenation or other functionalization reactions which are known to those skilled in the art.

The polymers prepared according to the present invention are very useful for, for example, producing films on blown film plants at high outputs. Films comprising the polymers prepared according to the present invention have good mechanical properties. The high puncture resistance of the films produced therefrom is also worthy of note.

The films obtained in this way are suitable, in particular, for the packaging sector and for large, heavy duty sacks and also for the food sector. Furthermore, the films have only a low blocking tendency and can therefore be passed through machines without use of lubricants and antiblocking additives or with use of only small amounts thereof.

The Phillips catalyst prepared according to the present invention has particular unexpected advantages. It is very useful for the homopolymerization and copolymerization of ethylene by the customary and known particle form processes in a gas-phase fluidized-bed polymerization. Here, it gives, at a high productivity, (co)polymers having excellent morphology and good processability. In particular, the catalyst of the present invention displays a good comonomer incorporation behavior and gives high productivities even at low activation temperatures. The (co)polymers prepared by means of the Phillips catalyst of the present invention are therefore particularly useful for processing by the blown film process and the blow molding process.

The following examples illustrate the invention.

The productivity of the catalyst is reported as the amount of polymer isolated per amount of Phillips catalyst used in g.

The melt flow index was determined in accordance with ISO 1133 at 190° C. under a load of 21.6 kg (190° C./21.6 kg, HLMI) and under a load of 2.16 kg (190° C./2.16 kg, MI.

The density [g/cm$^3$] was determined in accordance with ISO 1183.

The bulk density (BD) [g/l] was determined in accordance with DIN 53468.

The environmental stress cracking resistance (ESCR) was determined in Basell's round disk indentor test (RI). Test conditions: round disks (produced from a pressed plate, diameter 38 mm, thickness: 1 mm, scored on one side by means of a scratch having a length of 20 mm and a depth of 200 μm) are dipped at 50 or 80° C. into a 5% strength aqueous solution of Lutensol® FSA and loaded by means of a gas pressure of 3 bar. The time to occurrence of stress cracks which produce a pressure drop in the measuring apparatus is measured (in h).

The measurement of the dart drop impact strength was carried out on 20 μm films in accordance with ASTM 1709 A.

The Staudinger index (η)[dl/g] was determined at 130° C. on an automatic Ubbelohde viscometer (Lauda PVS 1) using decalin as solvent (ISO 1628 at 130° C., 0.001 g/ml of decalin).

The determination of the molar mass distributions and the means $M_n$, $M_w$ and $M_w/M_n$ derived therefrom was carried out by means of high-temperature gel permeation chromatography using a method based on DIN 55672 under the following conditions: solvent 1,2,4-trichlorobenzene, flow: 1 ml/min, temperature: 140° C., calibration using PE standards.

Abbreviations in the following tables:

| | |
|---|---|
| $T_{poly}$ | Temperature during the polymerization |
| $M_w$ | Weight average of the molar mass |
| $M_n$ | Number average of the molar mass |
| Density | Polymer density |
| DDI | Dart drop impact |
| ESCR | Environmental stress cracking resistance |
| % by volume | Percentage by volume of the respective component during the polymerization |
| Prod. | Productivity of the catalyst in g of polymer obtained per g of catalyst used |
| HLMI | Melt flow index at a loading weight of 21.6 kg |
| THA | Amount of trihexylaluminum used |
| η | Staudinger index |
| mg cat. | mg of the catalyst used in the polymerisation |
| Vinyl | Vinyl groups in the polymer per (1000 C.) |

EXAMPLES AND COMPARATIVE EXPERIMENTS

Example 1

The support material was prepared as described in DE 2 540 279.

Preparation of the Silica Xerogel

A mixing nozzle as shown in the figure in DE-A 2 103 243 and having the following data was utilized: the diameter of the cylindrical mixing chamber formed by a plastic tube is 14 mm, the length of the mixing zone (including after-mixing section) is 350 mm. The end of the mixing chamber nearest the inlet is closed off and near this end there is a tangential inlet hole having a diameter of 4 mm for the mineral acid. Four further holes likewise having a diameter of 4 mm and the same inflow direction for the water glass solution follow, with the spacing of the holes, measured in the longitudinal direction of the mixing chamber, being 30 mm. Accordingly, the ratio of length to diameter of the primary mixing zone is about 10:1. For the subsequent secondary mixing zone, this ratio is 15. As spraying nozzle, a flattened, slightly kidney shaped piece of tube was pushed over the outlet end of the plastic tube.

This mixing apparatus was supplied with 325 l/h of 33 percent strength by weight sulfuric acid at 20° C. and an operating pressure of about 3 bar and also 1100 l/h of water glass solution (prepared from technical-grade water glass containing 27% by weight of $SiO_2$ and 8% by weight of $Na_2O$ by dilution with water) having a density of 1.20 kg/l and a temperature of likewise 20° C. and a pressure of likewise about 3 bar. Progressive neutralization in the mixing chamber lined with the plastic tube resulted in formation of an unstable hydrosol which had a pH of 7-8 and remained in the after-mixing zone for about 0.1 s until completely homogenized before it was sprayed through the nozzle attachment into the atmosphere as a fan-shaped liquid jet. During its flight through the air, the jet broke up into individual droplets which, as a result of the surface tension, took on a largely spherical shape and solidified to form hydrogel spheres within about one second while still in flight. The spheres had a smooth surface, were clear as glass, contained about 17% by weight of $SiO_2$ and had the following particle size distribution:

| | |
|---|---|
| >8 mm | 10% by weight |
| 6-8 mm | 45% by weight |
| 4-6 mm | 34% by weight |
| <4 mm | 11% by weight |

(The particle size distribution can be varied at will by use of other nozzle attachments.) The hydrogel spheres were collected at the end of their flight in a scrubbing tower which was filled almost completely with hydrogel spheres and in which the spheres were washed free of salts immediately without aging by means of water containing a little ammonia and having a temperature of about 50° C. in a continuous countercurrent process.

The spheres which had a diameter in the range from 2 to 6 mm were isolated by sieving and 112 kg of these spheres were placed in an extraction vessel which had an inlet at the top, a sieve bottom and swan-neck shaped overflow which is connected to the bottom of the drum and keeps the liquid level in the drum sufficiently high for the hydrogel spheres to be completely covered with liquid. The hydrogel was extracted by means of methanol.

The spheres obtained in this way were then dried (12 hours at 120° C. under a pressure of 20 mbar) until no further weight loss occurred at 180° C. under a pressure of 13 mbar over a period of 30 minutes.

The spheres which had been dried in this way were subsequently milled and the xerogel particles which have a diameter of from 40 to 300 μm were isolated by sieving. The pore volume was 1.9 ml/g.

39 ml of titanium tetraisopropoxide were added to a solution of 11.6 g of chromium(III) nitrate nonahydrate (Cr(NO$_3$)$_3$x9H$_2$O) in 700 ml of methanol. The solution of chromium(III) nitrate nonahydrate and titanium tetraisopropoxide in methanol was clear and displayed no turbidity. The solution obtained in this way was added to 150 g of the above-described silica gel support. The suspension was stirred for 1 hour and then evaporated to dryness on a rotary evaporator at 80° C. with application of a vacuum. The precatalyst obtained in this way contains 1% by weight of chromium and 4% by weight of titanium, based on the weight of the precatalyst.

Comparative Example C1

Example 1 was repeated without addition of titanium tetraisopropoxide. The precatalyst obtained in this way contains 1% by weight of chromium, based on the weight of the precatalyst.

Example 2

400 g of chromium(III) nitrate nonahydrate were dissolved in 6.5 l of methanol while stirring in a dissolution reactor. After stirring for one hour, 0.97 l of titanium tetraisopropoxide were added and the mixture was stirred for another 5 minutes. This solution was subsequently pumped over a period of 1 hour onto 5 kg of the silica gel support Sylopol SG332 5N (commercially available from Grace) in a double cone drier. The dissolution reactor was then rinsed with 1.5 l of methanol which was then likewise added to the support. The suspension was then stirred for 1 hour and subsequently heated to 95° C. and the methanol was distilled off at 900 mbar. After about 3 hours, the pressure was reduced to 300 mbar and the product was dried under these conditions for a further 2 hours. The precatalyst obtained in this way contains 1% by weight of chromium and 3% by weight of titanium, based on the weight of the precatalyst.

Comparative Example C2

The procedure of Example 2 was repeated using 5 kg of the silica gel support Sylopol SG332 5N and 120 g of chromium (III) nitrate nonahydrate but without addition of titanium tetrapropoxide. The precatalyst obtained in this way contains 0.3% by weight of chromium, based on the weight of the precatalyst.

Example 3

1000 g of chromium(III) nitrate nonahydrate and 21 l of methanol were mixed with stirring in a dissolution reactor. After stirring for one hour, 2.3 l of titanium tetraisopropoxide were added to this solution and the mixture was stirred for 5 minutes. This solution was subsequently pumped over a period of 1 hour onto 18 kg of the silica gel support XPO2107 (commercially available from Grace) (which had been dried beforehand at 130° C. and 10 mbar for 7 hours in this double cone drier) in a double cone drier which was rotated uniformly. After the addition, the dissolution reactor was rinsed with 5 l of methanol and this rinsing solution was likewise added to the silica gel support. The suspension was stirred for a further 1 hour and was then dried at 90° C. with application of a vacuum until a pressure of 10 mbar at a temperature of 100° C. was reached after a period of 1 hour. The precatalyst obtained in this way contains 0.7% by weight of chromium and 2% by weight of titanium, based on the weight of the precatalyst.

Comparative Example C3

3.5 l of titanium tetraisopropoxide were mixed with 20 l of heptane while stirring in a dissolution reactor. After stirring for 10 minutes, the solution was pumped over a period of one hour onto 18 kg of the silica gel support XPO2107 (which had been dried beforehand at 130° C. and 10 mbar for 7 hours in this double cone drier) in a double cone drier which was rotated uniformly. The dissolution reactor was rinsed with 5 l of heptane and this rinsing solution was likewise transferred into the double cone drier. The suspension was then stirred for 1 hour. It was subsequently dried at 90° C. with application of a vacuum until a pressure of 10 mbar at a temperature of 100° C. was reached after 1 hour. 1000 g of chromium(III) nitrate nonahydrate and 23 l of methanol were subsequently mixed while stirring in the dissolution reactor. After stirring for 1 hour, this solution was pumped over a period of 1 hour onto the supported titanium compound in the rotating double cone drier. After the addition, the dissolution reactor was rinsed with 5 l of methanol and the rinsing solution was likewise transferred to the double cone drier. The suspension was stirred for a further 1 hour and then dried at 90° C. with application of a vacuum until a pressure of 10 mbar at a temperature of 100° C. was reached after 1 hour. The precatalyst obtained in this way contains 0.7% by weight of chromium and 3% by weight of titanium, based on the weight of the precatalyst.

Activation

Activation was carried out at 600 or 650° C. by means of air in a fluidized-bed activator. To activate the precatalyst, it was heated to 300° C. over a period of 1 hour, kept at this temperature for 1 hour, subsequently heated to the desired activation temperature, kept at this temperature for 2 (Examples 1 and C1) or 5 hours (Examples 2, 3, C2 and C3) and subsequently cooled. Cooling below 300° C. was carried out under nitrogen. The precatalysts from Examples 1, C1 and C2 were heated to an activation temperature of 750° C., the precatalyst from Example 2 was heated to an activation temperature of 600° C. and the precatalysts from Examples 3 and C3 were heated to an activation temperature of 520° C.

Polymerization

The polymerization experiments in Table 1 were carried out under the conditions specified in Table 1 at a total pressure of 40 bar and an output of 25 kg/h in a 180 l PF loop reactor (=particle-forming loop reactor) (suspension medium: isobutane). The catalysts described in Examples 1 and C1 served as catalyst.

The polymerization experiments in Table 2 were carried out in a continuous gas-phase fluidized-bed reactor (Lupotech G as described in WO99/29736 A1) under the conditions specified in the tables at a total pressure of 20 bar and an output of 50 kg/h.

The products prepared in the gas-phase process were granulated at 200° C. under protective gas on a ZSK 40. Processing to produce films was carried out on a blown film plant from W&H provided with a 60/25D extruder. The catalysts described in Examples 2, C2, 3 and C3 served as catalyst.

The results of the polymerizations and product tests are summarized in the tables.

TABLE 1

Polymerization in the loop reactor

| Catalyst from Ex. | $T_{Poly}$ [° C.] | % by volume of $C_2H_4$ | % by volume of $C_6H_{12}$ | Prod. [g/g] | Bulk density [g/l] | HLMI [g/10 min] | Density [g/cm$^3$] | Mw/Mn | ESCR 50° C. [h] |
|---|---|---|---|---|---|---|---|---|---|
| 1 | 104.5 | 15 | 0.11 | 15625 | 466 | 12.7 | 0.9557 | 14 | 4 |
| V1 | 106.6 | 10.1 | 0.14 | 5100 | 470 | 9.9 | 0.9565 | 12 | 6 |

TABLE 2

Polymerization in the gas phase

| Catalyst from Ex. | $T_{Poly}$ [° C.] | THA [g/h] | % by volume of $C_2H_4$ | % by volume of $C_6H_{12}$ | Prod. [g/g] | HLMI [g/10 min] | Density [g/cm$^3$] | Mw/Mn | ESCR 80° C. [h] | DDI [g] |
|---|---|---|---|---|---|---|---|---|---|---|
| 2  | 113   | 0.45 | 54.8 | 0.39 | 3799 | 25.8 | 0.9393 | 20   | 17 |     |
| V2 | 112.2 | 0.4  | 55.4 | 0.33 | 7136 | 23.6 | 0.9394 | 10.2 | 13 |     |
| 3  | 103.5 | 0.5  | 53.4 | 1.05 | 3692 | 19.6 | 0.9323 | 25.5 |    | 163 |
| V3 | 103.5 | 0.5  | 52.8 | 1.02 | 2921 | 16.5 | 0.9339 | 35.2 |    | 158 |

Example 4

1430 g of chromium(III) nitrate nonahydrate and 26 l of methanol were mixed with stirring in a dissolution reactor. After stirring for one hour, 2.3 l of titanium tetraisopropoxide were added to this solution and the mixture was stirred for 5 minutes. This solution was subsequently pumped over a period of 1 hour onto 18 kg of the silica gel support XPO2107 (commercially available from Grace). After the addition, the dissolution reactor was rinsed with 4 l of methanol and this rinsing solution was likewise added to the silica gel support. The suspension was stirred for a further 1 hour and was then dried at 95° C. with application of a. The precatalyst obtained in this way contains 1% by weight of chromium and 2% by weight of titanium, based on the weight of the precatalyst.

Comparative Example C4

Di-tert.butylchromate was prepared by adding to a suspension of 4.86 g $CrO_3$ and 10 g $MgSO_4$ in 300 ml of hexane a solution of 9.45 ml of tert.-butanol in 50 ml hexane. After stirring for 15 min the solution was filtered to give a hexane solution of di-tert.butylchromate.

31.5 ml of titanium tetraisopropoxide and the di-tert.butylchromate solution were added together onto 250 g of the silica gel support XPO2107 (commercially available from Grace). The suspension was then stirred for 1 hour. The hexane was distilled off and the resulting solid was subsequently dried at 80° C. with application of a vacuum. The precatalyst obtained in this way contains 1% by weight of chromium and 2% by weight of titanium, based on the weight of the precatalyst.

Activation

Activation was carried out at 520° C. by means of air in a fluidized-bed activator as described above.

Polymerization

The polymerization experiments in Table 3 were carried out at a total pressure of 40 bar, 100° C. for 90 min in a 1 l autoclave reactor (suspension medium: isobutane 400 ml, 10 ml hexene). The catalysts described in Examples 4 and C4 served as catalyst. Both showed a productivity of about 6000 g of polymer per g catalyst. The new catalyst gave ethylene copolymers with a higher molecular weight (Mw and Mn) and a broader molecular weight distribution (Mw/Mn) with about the same density than the catalyst prepared in an aprotic medium (comparative example C4).

TABLE 3

Polymerization in the autoclave reactor

| Catalyst from Ex. | mg Kat. | THA: Cr (mol) | η [dl/g] | Mw [g/mol] | Density [g/cm$^3$] | Mw/Mn | Vinyl |
|---|---|---|---|---|---|---|---|
| 4  | 45 | 1:12 | 6.68 | 515388 | 0.9434 | 61.54 | 1.61 |
| V4 | 44 | 1:13 | 4.39 | 381997 | 0.9446 | 55.81 | 2.04 |

The invention claimed is:

1. A process for preparing supported, titanized chromium catalysts, which comprises the following steps:
    A) in a single step, bringing a support material into contact with a protic medium having a water content less than 20% by weight and comprising a titanium compound and a chromium compound, wherein the protic medium comprises an alcohol selected from the group consisting of methanol, ethanol, 1-propanol, 1-butanol, 1-pentanol, 1-hexanol, and 2-ethylhexanol;
    B) optionally, removing the protic medium, thereby forming a precatalyst;
    C) optionally, calcining the precatalyst obtained after step B); and
    D) optionally, activating the precatalyst obtained after step B) or C) in an oxygen-containing atmosphere at from 400° C. to 1100° C.

2. The process as claimed in claim 1, wherein the support material is a silica gel.

3. The process as claimed in claim 1, wherein the support material is a silica xerogel.

4. The process as claimed in claim 1, wherein the chromium compound is an inorganic chromium compound.

5. The process as claimed in claim 4, wherein the inorganic chromium compound is chromium(III) nitrate nonahydrate.

6. The process as claimed in claim 1, wherein the titanium compound is titanium tetraisopropoxide, titanium tetra-n-butoxide or a mixture thereof.

7. The process as claimed in claim 1, wherein the protic medium is methanol.

* * * * *